United States Patent
Wiesboeck

[15] 3,635,673
[45] Jan. 18, 1972

[54] FLUORINATION OF BORIC ACID AND PHOSPHOROUS ACID

[72] Inventor: Robert A. Wiesboeck, Atlanta, Ga.
[73] Assignee: United States Steel Corporation
[22] Filed: July 31, 1970
[21] Appl. No.: 60,147

[52] U.S. Cl. ...................................23/205, 23/153
[51] Int. Cl. ..............................C01b 7/22, C01b 9/08
[58] Field of Search ............................23/205, 153

[56] References Cited

UNITED STATES PATENTS 2,622,014   12/1952   Kirshenbaum.....................23/205

Primary Examiner—Earl C. Thomas
Assistant Examiner—G. Alvaro
Attorney—Gene Harsh

[57] ABSTRACT

A method of producing boron trifluoride or phosphorus trifluoride using a metal fluorosulfonate fluoride, $MF(FSO_3)$, as the fluorinating agent is disclosed. Boric acid, $H_3BO_3$, and phosphorous acid, $H_3PO_3$, respectively, are employed as the boron or phosphorus source.

10 Claims, No Drawings

FLUORINATION OF BORIC ACID AND PHOSPHOROUS ACID

BACKGROUND OF THE INVENTION

Conventional processes (U.S. Pat. No. 2,148,514 and U.S. Pat. No. 2,196,907) for the production of boron trifluoride, $BF_3$, are based on the reaction of borax, $Na_2B_4O_7 \cdot 10H_2O$, with calcium fluoride, $CaF_2$, and sulfuric acid, $H_2SO_4$, or with hydrogen fluoride, HF, followed by treatment with fuming sulfuric acid as demonstrated in the following equations:

$$Na_2B_4O_7 \cdot 10H_2O + 6CaF_2 + 8H_2SO_4 \rightarrow 4BF_3 + 6CaSO_4 + 17H_2O + 2NaHSO_4$$

$$Na_2B_4O_7 + 12HF \rightarrow Na_2[O(BF_3)_4] + 6H_2O$$

$$Na_2[O(BF_3)_4] + 2H_2SO_4 \rightarrow 4BF_3 + 2NaHSO_4 + H_2O$$

Another method (U.S. Pat. No. 2,416,133) involves the reaction of boric acid, $H_3BO_3$, with fluorosulfonic acid, $HSO_3F$.

$$H_3BO_3 + 3HSO_3F \rightarrow BF_3 + 3H_2SO_4$$

The preparation of phosphorus trifluoride, $PF_3$, is based on the halogen exchange of phosphorus trichloride, $PCl_3$, with hydrogen fluoride or with metal fluorides such as zinc fluoride, $ZnF_2$ (T. Kruck, *Angew. Chem. Intern. Ed. Engl.* 6, 53–1967):

$$PCl_3 + 3HF \rightarrow PF_3 + 3HCl$$

$$2PCl_3 + 3ZnF_2 \rightarrow 2PF_3 + 3ZnCl_2$$

SUMMARY OF THE INVENTION

This invention describes a novel method of producing boron trifluoride and phosphorus trifluoride using a metal fluorosulfonate fluoride as the fluorinating agent and boric acid and phosphorous acid as the boron and phosphorus sources. The fluorination also produces hydrogen fluoride as a reaction byproduct which may be collected with the main product or separated by fractional condensation.

The process is expressed by the following equation:

$$H_3BO_3 + 3MF(FSO_3) \rightarrow BF_3 + 3HF + 3MSO_4$$

$$H_3PO_3 + 3MF(FSO_3) \rightarrow PF_3 + 3HF + 3MSO_4$$

DETAILED DESCRIPTION

The fluorination of boric acid with an alkaline earth fluorosulfonate fluoride, such as calcium or barium fluorosulfonate fluoride, is carried out by mixing the pulverized reactants thoroughly and heating to 50°–350° C., preferably 150°–200° C., while excluding moisture.

An equimolar mixture of a metal fluoride and a metal fluorosulfonate, such as $CaF_2$ and $Ca(FSO_3)_2$, can be used in place of the fluorosulfonate fluoride, $CaF(FSO_3)$. In this case, the cation may be chosen from any of the alkali or alkaline earth metals. Any combination of salts of the alkali or alkaline earth metal chosen is effective as long as the molar ratio of fluoride to fluorosulfonate is approximately 1:1.

The evolution of boron trifluoride in the fluorination of boric acid begins at approximately 50° C., becoming quite vigorous at 150°–200° C. Since the rate of reaction is dependent upon the particle size of the reactants, it is preferable that the particles should be smaller than 4 mesh, and most preferable that they be −200 mesh.

The heating of the reactants can be carried out in an agitated vessel at atmospheric or superatmospheric pressure. The gases may be vented or may be allowed to accumulate in the reactor.

Of the many alkali or alkaline earth fluoride plus fluorosulfonate mixtures or alkaline earth fluorosulfonates which may be used to produce boron trifluoride and hydrogen fluoride from boric acid, I prefer to employ calcium fluorosulfonate fluoride since it is the most economical source and maintains a dry, free-flowing reaction bed, resulting in higher yields and easier handling.

Although the proportions of boric acid to the fluorosulfonate fluoride can be varied widely, optimum utilization of the reactants is obtained at a 1:3 molar ratio; i.e., 1 part by weight of boric acid to 7.6 parts by weight of calcium fluorosulfonate fluoride.

The volatile reaction product consists of approximately equal portions of boron trifluoride and hydrogen fluoride, which are either separated by known methods or used together for certain catalytic applications such as are disclosed in U.S. Pat. Nos. 3,458,590 and 3,441,538.

The fluorination of phosphorous acid follows closely that described for boric acid. Since phosphorous acid tends to decompose above 180° C., forming phosphine, it is advantageous to limit the reaction temperature to 150° C., and to inject the phosphorous acid as a melt (m.p. 73° C.) into the agitated bed of hot calcium fluorosulfonate fluoride.

Calcium fluorosulfonate fluoride is the preferred fluorinating agent since it produces highest yields and a dry, free-flowing reaction bed. The optimum utilization of reactants is achieved at a 1:3 molar ratio of phosphorous acid to the fluorosulfonate fluoride; i.e., 1 part by weight of phosphorous acid to 5.8 parts by weight of calcium fluorosulfonate fluoride.

Purification and separation of the volatile reaction product may be achieved by any conventional means, as for example by passing the gas through a refrigerated column (−40° C.) at atmospheric or superatmospheric pressure, which condenses the hydrogen fluoride. Remaining traces of hydrogen fluoride may be removed from the phosphorus trifluoride by absorption on pelletized sodium fluoride at ambient temperature.

The invention is further illustrated by the following examples:

EXAMPLE 1

Calcium fluorosulfonate fluoride (48.2 g.) and boric acid (6.2 g.) were mixed intimately in a mortar and placed in an aluminum reactor while excluding moisture by a blanketing atmosphere of dry nitrogen. After evacuation, the vessel was heated to 200° C. over a 2-hour period. A pressure of 240 p.s.i. developed. The gas was allowed to expand into an evacuated fractionation train with cold traps maintained at −78° and −196° C., respectively. A total of 4.8 g. of hydrogen fluoride and 5.2 g. of boron trifluoride was collected.

EXAMPLE 2

An intimate mixture of sodium fluoride (12.8 g.), sodium fluorosulfonate (37.0 g.), and boric acid (6.2 g.) was reacted as described in example 1. The reaction product consisted of 4.1 g. of hydrogen fluoride and 4.9 g. of boron trifluoride.

EXAMPLE 3

Boric acid (12.4 g.) and barium fluorosulfonate fluoride (154.2 g.) was placed in a Teflon bottle and heated to 200° C. over a 3-hour period. The evolving gas was passed through cold traps maintained at −78° and −196° C., respectively. After completion of the reaction, a slow stream of dry nitrogen was passed through the reactor to transfer the residual gaseous product into the traps. The reaction produced 9.6 g. of hydrogen fluoride and 10.2 g. of boron trifluoride.

EXAMPLE 4

Calcium fluorosulfonate fluoride (40.9 g.) and phosphorous acid (7.0 g.) were mixed thoroughly in a mortar while excluding moisture. The reactants were then transferred to an aluminum cylinder. After evacuation, the reactor was slowly heated to 150° C. Pressure developed rapidly, beginning at 50° C., and reaching 192 p.s.i. at 150° C. The evolved gas was vented into a series of evacuated cold traps maintained at −78° and −196° C., respectively. A total of 4.5 g. of hydrogen fluoride and 7.8 g. of phosphorus trifluoride was collected.

EXAMPLE 5

Barium fluorosulfonate fluoride (255.0 g.) was placed in a Teflon bottle, equipped with a mechanical stirrer, and heated to 150° C. While stirring rapidly, a melt of phosphorous acid (27.0 g.), maintained at 100° C. was injected slowly. The evolved gas was passed through a −78° C. trap to condense the hydrogen fluoride, and then through a −196° C. trap to collect the phosphorus trifluoride. The reaction produced 14.6 g. of hydrogen fluoride and 19.8 g. of phosphorus trifluoride within 3 hours.

EXAMPLE 6

A mixture of calcium fluoride (39.1 g.) and calcium fluorosulfonate (120.0 g.) was reacted with phosphorous acid (27.0 g.) as described in example 5. After completion of the run, the cold traps contained 17.5 g. of hydrogen fluoride and 26.9 g. of phosphorus trifluoride, respectively.

EXAMPLE 7

The process was carried out as described in example 5 using potassium fluoride (58.1 g.), potassium fluorosulfonate (138.9 g.) and phosphorous acid (27.3 g.). The product consisted of 15.0 g. of hydrogen fluoride and 22.8 g. of phosphorus trifluoride.

The above examples are intended to illustrate my invention and are not intended to limit it. I intend to cover all embodiments within the spirit of my disclosure and intend to be limited only by the claims appended thereto.

I claim:

1. The method of preparing boron trifluoride comprising reacting particles of boric acid with particles of an alkaline earth fluorosulfonate fluoride at a temperature of from about 50° to about 350° C. at atmospheric pressure or above while excluding moisture and collecting the reaction products.

2. The method of claim 1 wherein the particles of the reactants are smaller than size 40 mesh.

3. The method of claim 1 wherein the temperature is about 150°–200° C.

4. The method of claim 1 wherein the reaction products are separated by fractional condensation at −40° C. at atmospheric pressure or above.

5. The method of claim 1 wherein the particles are −200 mesh.

6. The method of claim 1 wherein the alkaline earth fluorosulfonate fluoride is calcium or barium fluorosulfonate fluoride.

7. The method of claim 1 wherein the molar ratio of boric acid to the fluorosulfonate fluoride is about 1:3.

8. The method of preparing boron trifluoride comprising reacting an equimolar amount of an alkali or alkaline earth fluoride and an alkali or alkaline earth fluorosulfonate with particulate boric acid at a temperature of from about 50° to about 350° C. at atmospheric pressure of above while excluding moisture and collecting the reaction products.

9. The method of claim 8 wherein said particles are smaller than size 40 mesh.

10. The method of claim 8, wherein the reaction products are separated by fractional condensation at −40° C. at atmospheric pressure or above.

* * * * *